(12) United States Patent
Lane

(10) Patent No.: US 7,146,185 B2
(45) Date of Patent: Dec. 5, 2006

(54) MOBILE STATION-CENTRIC METHOD FOR MANAGING BANDWIDTH AND QOS IN ERROR-PRONE SYSTEM

(76) Inventor: Richard Lane, 14434 Calle Nablado, San Diego, CA (US) 92129

( * ) Notice: Subject to any disclaimer, the term of this patent is extended or adjusted under 35 U.S.C. 154(b) by 368 days.

(21) Appl. No.: 10/461,987

(22) Filed: Jun. 12, 2003

(65) Prior Publication Data

US 2004/0253980 A1    Dec. 16, 2004

(51) Int. Cl.
 *H04B 1/38*    (2006.01)
(52) U.S. Cl. .............................. 455/552.1; 455/553.1; 455/556.1; 455/556.2
(58) Field of Classification Search ............... 370/347, 370/447, 469, 311, 318, 320, 441; 455/552.1, 455/553.1, 556.1, 556.2
See application file for complete search history.

(56) References Cited

U.S. PATENT DOCUMENTS 6,937,591 B1 *  8/2005  Guo et al. ................... 370/338
2002/0054578 A1 *  5/2002  Zhang et al. ............... 370/328

* cited by examiner

*Primary Examiner*—Bing Q. Bui
(74) *Attorney, Agent, or Firm*—Philip R. Wadworth; Sandip (Micky) S. Minhas; Dang M. Vo

(57) ABSTRACT

A wireless transmission system for multimedia information having plural layers includes a base station (BTS) and a mobile station (MS) that can select which layers to transmit based on reported channel conditions, mobile location, and/or forward error correction (FEC) used for a particular layer. A respective FEC rate and/or power level can be dynamically established for each layer by a mobile station dependent on available bandwidth and/or reception and decoding capability of the BTS.

14 Claims, 2 Drawing Sheets

SYSTEM EXEMPLARY

BLOCK DIAGRAM

MOBILE STATION-CENTRIC METHOD FOR MANAGING BANDWIDTH AND QOS IN ERROR-PRONE SYSTEM

FIELD OF THE INVENTION

The present invention relates generally to multimedia transmission.

BACKGROUND

Multimedia such as video and audio can be transmitted over a number of paths, including cable, the Internet, cellular and broadcast. For instance, satellite or terrestrial broadcast stations or cellular systems can be used to transmit multimedia to mobile computing devices such as mobile telephones. The multimedia data can be formatted in accordance with Moving Pictures Expert Group (MPEG) standards such as MPEG-1, MPEG-2 (also used for DVD format), MPEG-4 and other block based transform codecs. Essentially, for individual video frames these multimedia standards use Joint Photographic Experts Group (JPEG) compression. In JPEG, the image of a single frame is typically divided into small blocks of pixels (usually 8×8 and/or 16×16 pixel blocks) that are encoded using a discrete cosine transform (DCT) function to transform the spatial intensity values represented by the pixels to spatial frequency values, roughly arranged, in a block, from lowest frequency to highest. Then, the DCT values are quantized, i.e., the information is reduced by grouping it into chunks by, e.g., dividing every value by 10 and rounding off to the nearest integer. Since the DCT function includes a progressive weighting that puts bigger numbers near the top left corner of a block and smaller numbers near the lower right corner, a special zigzag ordering of values can be applied that facilitates further compression by run-length coding (essentially, storing a count of the number of, e.g., zero values that appear consecutively, instead of storing all the zero values). If desired, the resulting numbers may be used to look up symbols from a table developed using Huffman coding to create shorter symbols for the most common numbers, an operation commonly referred to as "variable length coding". Other variable length coding schemes can be used as well, including Arithmetic coding. Motion pictures add a temporal dimension to the spatial dimension of single pictures. MPEG is essentially a compression technique that uses motion estimation to further compress a video stream. Other non-block-based encoding schemes such as wavelets, matching pursuits, etc can be used. Other forms of multimedia include audio, graphics, etc.

Internet Protocol (IP)-based principles such as point-to-point protocol (PPP) framing of IP packets can be used to communicate multimedia data, including MPEG data. PPP can be used not only for communicating IP packets over wired portions of the Internet, but also to communicate data over wireless transmission paths to user computers that employ wireless communication principles such as but not limited to code division multiple access (CDMA) technology, GSM, wideband CDMA (WCDMA or UMTS), OFDM and other wireless technologies.

Typically, multimedia data is voluminous, which means that significant transmission path bandwidth, unfortunately a finite resource, must be used. This is particularly the case for high fidelity multimedia, e.g., high resolution video. That is, the higher the quality of service (QoS) provided, the more bandwidth must be used.

As recognized by the present invention, several multimedia streams can be pooled together in a single channel. The channel might have a constant overall bandwidth in terms of bit rate, i.e., the number of bits that can be transmitted in the channel per unit time cannot exceed the "bandwidth" of the channel. Typically, each stream in the channel will be accorded a fixed fraction of the bandwidth. Accordingly, the bit rate for each multimedia stream typically is fixed.

A "base layer" is an MPEG-related term that may be defined as the most important part of the multimedia bit stream which, if successfully received, decoded, and presented to the user, would result in a baseline level of video, audio, or other multimedia stream acceptable to the user. On the other hand, an "enhancement layer" would, when combined with the base layer, enhance or improve the quality, resolution, frequency, signal-to-noise ratio, etc. of the multimedia stream when presented to the user, compared to that of the base layer alone.

With the above discussion in mind, it will be appreciated that in wireless transmission of multimedia to battery powered mobile devices, three goals—efficient bandwidth use, mobile device power consumption, and highest QoS—compete with each other. This is particularly true when one considers that wireless channels are more "lossy" (they experience more lost data) than wired channels. To guarantee some higher levels of QoS, extra bandwidth might be required for retransmission of lost data. The alternative is to accept lost data frames and, hence, reduced QoS. These problems become more severe the further a receiver is from a base station, and with high use channels. As an alternative to retransmission, a software application in a receiver experiencing reduced QoS can attempt to execute advanced error correction schemes, but this in turn drains the battery of the receiver by requiring the RF receiver to be on longer and requiring more complex decoding, and may still result in unacceptably low QoS. Having recognized these problems, the below-described solutions to one or more of them are provided herein.

SUMMARY OF THE INVENTION

A wireless transmission system for multimedia information having plural layers includes a mobile station (MS) that selects which layers to transmit either to or from the mobile station based on channel conditions, and/or mobile location, and/or mobile station limitations, and/or user priority, and/or content priority, and/or billing plans, and/or forward error correction (FEC) used for a particular layer. The MS may also energize its radio only as long as necessary to receive preselected portions of the multimedia based on an actual error rate and/or power in received data, and/or a forward error correction (FEC) rate.

In a preferred non-limiting embodiment, if an actual error rate at least equals a threshold for a particular layer, the MS energizes its radio only during periods containing information pertaining to layers other than the particular layer such that mobile stations energize their radios only to capture layers they can use, thereby conserving mobile station battery life and decoding processing power. The MS may energize its radio only during periods in which layers which employ sufficient FEC and/or power to be received, demodulated and decoded are present for reception.

In another aspect, a method for transmission of multimedia data characterized by at least a base layer and at least one enhancement layer includes receiving, from at least one base station (BTS), information representing at least one actual operational parameter associated with the multimedia data.

The method also includes dynamically establishing, at a mobile station (MS), an error correction rate and/or a power level of at least one layer of the multimedia data based at least in part on the information representing at least one actual operational parameter.

In yet another aspect, a mobile station (MS) for wirelessly transmitting digital multimedia having at least N layers to at least one base station (BTS) includes means for transmitting only N-1 layers or fewer, based on at least one of: FEC rates, power levels, channel conditions, mobile location, mobile station limitations, user priority, content priority, and billing plans, sufficient to allow the layers to be successfully received, demodulated, and decoded by the BTS.

In another aspect, a mobile station (MS) for wirelessly receiving digital multimedia having at least N layers from at least one base station (BTS) includes means on the MS for instructing the BTS to transmit only N-1 layers or fewer, based on at least one of: FEC rates, power levels, channel conditions, mobile location, mobile station limitations, user priority, content priority, and billing plans, sufficient to allow the layers to be successfully received, demodulated, and decoded by the MS. It is to be appreciated that a mobile station user may choose to have only a portion of the multimedia stream transmitted to the MS from the BTS (e.g., a user who wishes just to listen to the audio portion of a television program without viewing it).

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
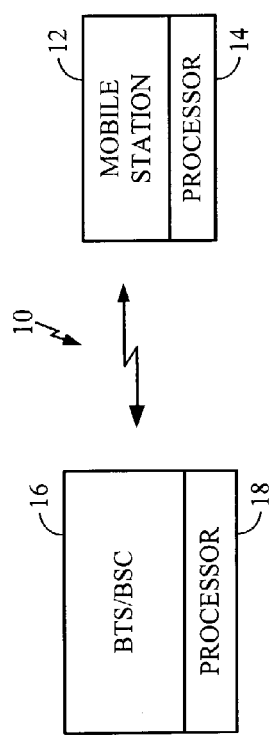
FIG. 1 is a block diagram of the present architecture.

Referring initially to the non-limiting preferred embodiment shown in FIG. 1, a system 10 includes at least one mobile station 12 having at least one processor 14 and at least one base station (BTS) 16 transmitting digital multimedia streams and having a processor 18. In some implementations the BTS 16 may be a combined BTS and base station controller (BSC).

The preferred non-limiting BTS 16 uses wireless means, and more particularly uses code division multiple access (CDMA) principles. The streams can be broadcast or multicast to plural mobile stations 12 if desired, or transmitted using point-to-point wireless transmission principles, or multicast to groups of users. It is to be understood that the present principles apply to other forms of wireless communication such as GSM, TDMA, wideband CDMA, OFDM, etc. as well as transmission of multimedia over cable systems, the Internet, etc. As used herein in the singular, "multimedia stream" means a single stream representing a single program, e.g., a single music piece or a single television show or movie potentially with accompanying text, images, etc.

In one non-limiting preferred implementation the system 10 is a code division multiple access (CDMA) system that, e.g., uses cdma2000, cdma2000 3×, or cdma2000 high data rate (HDR) principles, or other CDMA principles. In one non-limiting embodiment the mobile station 12 is a mobile telephone made by Kyocera, Samsung, or other manufacturer that uses Code Division Multiple Access (CDMA) principles and CDMA over-the-air (OTA) communication air interfaces. The present invention, however, applies to other mobile stations such as laptop computers, wireless handsets or telephones, data transceivers, or paging and position determination receivers. The mobile station 12 can be hand-held or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. One example could be to transfer different layers over different channels including different physical layers of different communication systems, as set forth in U.S. patent application Ser. Nos. 10/283,990 (now abandoned, published as U.S. Publication No. 2004-0081199), and 10/283,876 (now abandoned, published as U.S. Publication No. 2004-0093427), incorporated herein by reference. Wireless communication devices are also sometimes referred to as user terminals, mobile stations, mobile units, subscriber units, mobile radios or radiotelephones, wireless units, or simply as "users" and "mobiles" in some communication systems. It is to be understood that the present invention applies equally to other types of wireless devices including without limitation GSM devices, time division multiple access (TDMA) systems, OFDM (802.11), etc.

Figure 2:
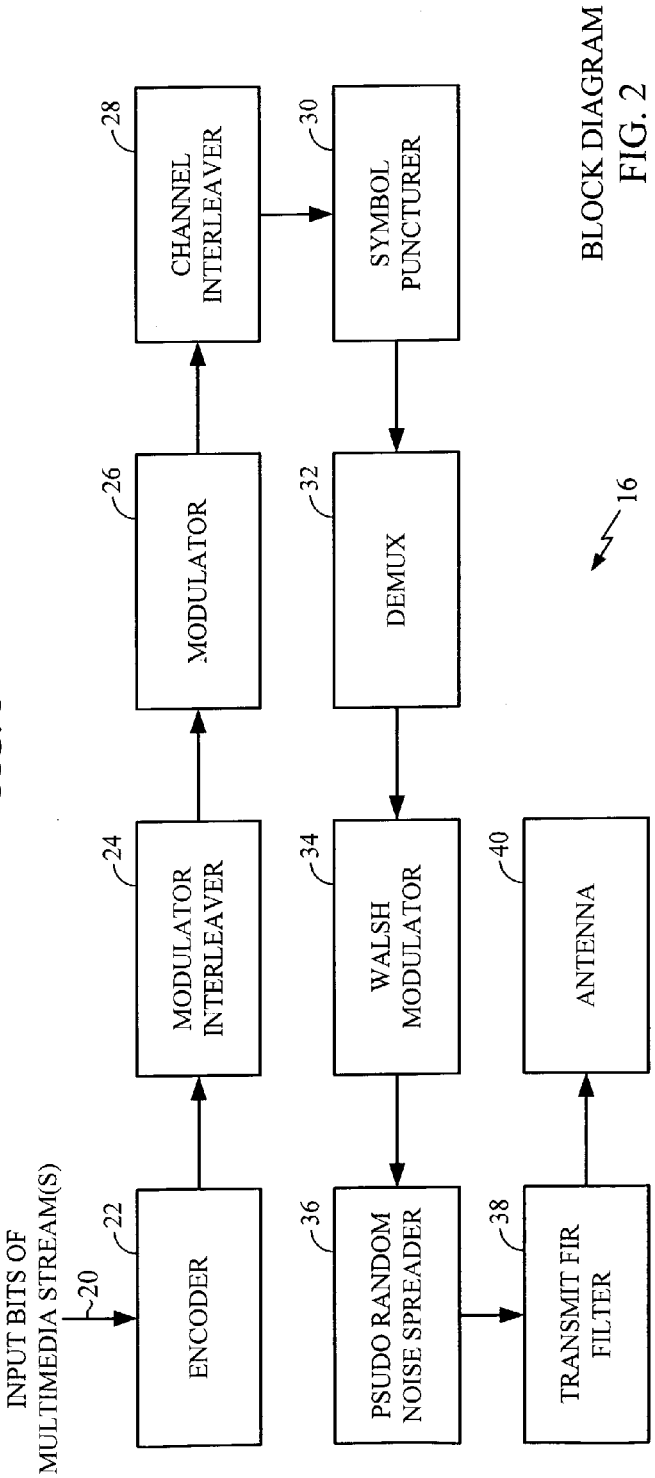
FIG. 2 is a block diagram of an exemplary non-limiting transmitting system.

Now referring to FIG. 2, which shows a transmitting system that can be used by either the MS 12 or BTS 16, input bits 20 contain the information representing layered multimedia streams. Each multimedia stream may include a base layer providing a minimum quality of service (QoS) and one or more enhancement layers providing heightened QoS. Layers can also contain respective portions of a compound multimedia program such as video, audio, graphics, text, etc.

The bits 20 are sent to an encoder 22. The encoder 22 can be a Forward Error Correction (FEC) encoder that introduces redundancy in the bits 20 using convolutional coding techniques known in the art. To do this, the preferred encoder 22 may establish, under the control of the BTS processor 18, an error correction rate that essentially generates more redundancy for greater robustness at the cost of requiring increased bandwidth to support the larger number of bits, or that generates less redundancy to conserve bandwidth at the cost of risking more uncorrectable errors at the receivers. Thus, the redundancy introduced by the encoder 22 enables the mobile stations 12 to correct some detection errors without the need to increase transmission power.

The output of the encoder 22 is generally referred to as "code symbols." Generally, a single message data bit 20 input to the encoder 22 corresponds to one or more code symbols output from the encoder 22. In an alternative approach, the encoder 22 performs a "source encoding" function prior to the redundancy encoding discussed above. Source encoding involves performing data compression for efficient representation of input data bits 20 prior to introducing redundancy and the generation of code symbols.

A modulation interleaver 24 receives code symbols from the encoder 22 and "interleaves" the code symbols prior to processing by a modulator 26. In the exemplary system shown, the interleaver 24 may be a block interleaver or a convolutional interleaver.

The interleaved code symbols are passed on to the modulator 26. In wireless digital communications, a number of different, but related, modulation schemes can be used in the modulator 26. For example, Binary Phase Shift Keying (BPSK), Differential Phase Shift Keying (DPSK), Quadrature Phase Shift Keying (QPSK) (including OQPSK and n/4QPSK), and Quadrature Amplitude Modulation (QAM), are digital modulation techniques which can be used in the modulator 26 to modulate the code symbols generated by the modulation interleaver 24. However, the modulator 26 is not limited to any specific type of modulator and can be any of the many digital modulators used in wireless communications. The invention can also be applied to wired systems.

If desired, the channel interleaved symbols from the interleaver 28 may be passed on to a symbol puncture element 30, which can insert control information, such as power control information, in the data for proper handling of the communications between the transmitter and the receiver. The control symbols punctured into the message symbols can be time division multiplexed into the message symbols as disclosed in U.S. patent application Ser. No. 10/616,585 (now abandoned, published as U.S. Publication No. 2005-0020201), incorporated herein by reference.

If further desired, the symbol stream output by the symbol puncture element 30 can be sent to a demultiplexer (DE-MUX) 32, which can be used for demultiplexing the input symbol stream into a number of parallel output symbol streams. In the exemplary BTS 16 shown in FIG. 2, the DEMUX 32 may be a one-to-sixteen demultiplexer.

From the DEMUX 32, particularly for BTS applications, the streams are sent to a Walsh function modulator 34 (that can include a Walsh function matrix of, e.g., order 16). In other embodiments, a Walsh function matrix of other orders such as 64 or 128 may be used. It is noted that, in the exemplary system 10, the parallel outputs of the DEMUX 32 can correspond to a single user or multimedia layer or program, or plural different users/streams/layers. In any case, Walsh modulation is performed on each of the parallel input symbols coming from the DEMUX 32, which is used to transform each input symbol into a respective sequence of output signals where each sequence of output signals is orthogonal with every other sequence of output signals.

As shown in FIG. 2, a Pseudorandom Noise (PN) spreader 36 may be provided to "spread" the signal in accordance with principles known in the art. The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in a "high data rate" communication systems, disclosed in U.S. Pat. No. 6,574,211, entitled "Method and Apparatus for High Rate Packet Data Transmission"and is also hereby fully incorporated by reference into the present application.

From the PN spreader 36 the signal may be sent to a finite impulse response (FIR) filter 38, which may be a FIR filter used for pulse shaping signals prior to their transmission over a communication channel. The output of the transmit FIR filter 38 is sent through an antenna 40 across the communication channel to the receiver(s). The communication channel usually refers to the physical medium which is used to send the signals from the transmitter to the receiver.

Figure 3:
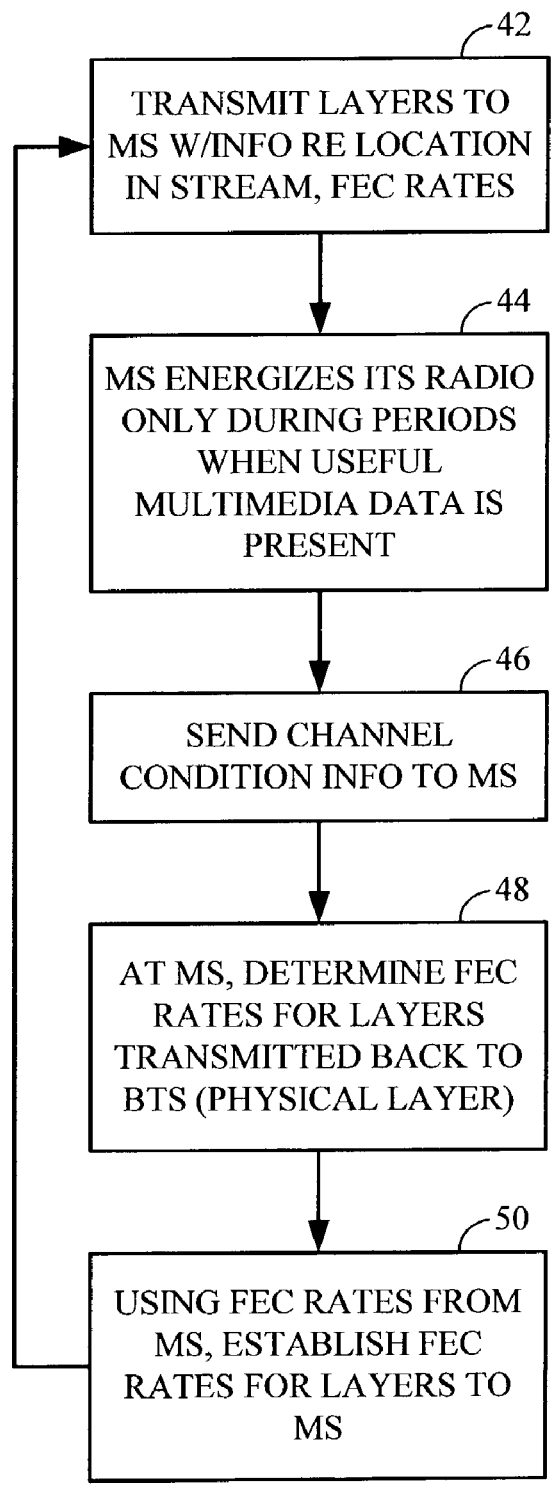
FIG. 3 is a flow chart of the present logic.

Now referring to FIG. 3, an exemplary non-limiting implementation of the present logic is shown, it being understood that the logic could be depicted in other ways. In essence, the logic is executed by one or both of the processors 14, 18 to select which layers of multimedia streams to transmit or receive based on channel conditions, and/or mobile station location, and/or the forward error correction (FEC) used for a particular layer, and/or mobile station limitations, user preferences, user priority, content priority, and billing plans. Also, in multicasting applications, the determination can be based on location and number of users in the multicast group. The time that a mobile station 12 receiver is on during transmission and reception of multimedia signals can thus be minimized to reduce power consumption and control bandwidth consumption in the cellular system in accordance with U.S. patent application Ser. Nos. 10/632,637 (published as U.S. Publication No. 2004-0077311) and 10/798,620 (published as U.S. Publication No. 2004-0179605), incorporated herein by reference. The BTS 16 can employ different FEC rates and/or different power levels for the various layers upon request from the mobile stations, depending on available bandwidth and current channel usage and priorities, in accordance with U.S. patent application Ser. Nos. 10/283,931 (published as U.S. Publication No. 2004-0083495) and 10/283,904 (now abandoned, published as U.S. Publication No. 2004-0083417), incorporated herein by reference.

With the above general description of the logic in mind, commencing at block 42 of FIG. 3, multimedia layers are transmitted by the BTS 16 along with information identifying where in the stream groups of packets of each layer has been inserted. Also, if desired each layer can be transmitted with its own respective FEC rate and/or power level, and these rates can also be identified in the transmitted stream.

Also, a MS may signal the BTS to inform it which layers the MS can use and/or which layers are to be transmitted. If the connection is a point-to-point connection, the BTS can transmit only the requested layers at the requested FEC rates (e.g., audio only or text only at very low FEC rates). If the MS is part of a multicast group, the BTS can use the data from all the MS to decide which layers at which FEC rates to transmit, e.g., base layers only.

Using the temporal position information relating to when portions of each layer appear in the stream, at block 44 the MS 12 can energize its radio only so long as necessary to receive usable data. For example, an MS 12 might find that an enhancement layer contains too many errors to be usable, and thus would energize its radio only during periods when base layer portions are transmitted. The MS also saves power by not demodulating, or not channel decoding, or not source decoding the unneeded/unwanted layers. Or, an MS 12 might determine that a layer has a FEC rate and/or power level that is insufficient for the purposes of the MS 12 application, or that is such that undue decoding would be required to use the layer. In any case, the MS 12 samples only the portions of the stream that can be easily decoded and reconstructed by seeking the portions of the streams with sufficient FEC rates to guarantee a reliable stream of data.

Moving to block 46, feedback may also be sent from the BTS 16 to the MS 12 over an access channel, a paging channel, an overhead channel, or other channel. The feedback represents one or more actual operational parameters associated with the multimedia data, such as channel conditions as might be indicated by, e.g., interference, actual data error rates being experienced, multipath interference, power levels, etc. The feedback can also indicate actual or desired FEC rate and/or power in the received data, as well as information relating to the position of the mobile station 12.

Based on this feedback, the MS 12 can ascertain which multimedia layers to transmit back to the BTS 12, and/or the most appropriate FEC rate and/or power for each layer, at block 48. More specifically, the MS 12 can reduce the amount of time needed to transmit multimedia by only transmitting the layers that employ sufficient FEC rates/power levels to be received, demodulated, and decoded by the BTS 16, saving bandwidth as well. Accordingly, the MS 12 may selectively transmit back to the BTS 16 only a subset of the layers that may be available for transmission.

Moving to block 50, the BTS 16 may use the FEC rate information from the data received from the MS 12 to vary or otherwise dynamically establish the FEC rates and/or power levels for the layers it is transmitting. As understood herein this further reduces MS power consumption and bandwidth consumption. The logic may periodically loop back to block 42.

As mentioned above, instead of establishing FEC rate layer by layer, the principles advanced herein can be used to establish a power for each layer that is transmitted. This invention results in power savings on the mobile device, reduced over-the-air (OTA) RF radio power consumption, reduced OTA receiver demodulator power, OTS receiver decode power, and multimedia application decode savings. In addition, the invention provides increased control over bandwidth allocation to users and multicast groups as well as overall savings of system bandwidth and/or system spectrum.

While the particular MOBILE STATION-CENTRIC METHOD FOR MANAGING BANDWIDTH AND QoS IN ERROR-PRONE SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. Section 112, sixth paragraph, unless the element is expressly recited using the phrase "means for" or, in the case of a method claim, the element is recited as a "step" instead of an "act".

What is claimed is:

1. A wireless transmission system for multimedia information having plural layers, comprising:
   at least one mobile station (MS) undertaking at least one of:
      selecting which layers to transmit to and/or from the mobile station based on at least one of: channel conditions, mobile location, mobile station limitations, user priority, content priority, billing plans, and forward error correction (FEC) used for a particular layer; and
      energizing a radio associated with the MS only as long as necessary to receive preselected portions of the multimedia based on at least one of: an actual error rate in received data, a power level, and a forward error correction (FEC) rate.

2. The system of claim 1, wherein if an actual error rate at least equals a threshold for a particular layer, the MS energizes its radio only during periods containing information pertaining to layers other than the particular layer such that mobile stations energize their radios only to capture layers they can use, thereby conserving mobile station battery life and decoding processing power.

3. The system of claim 2, wherein the MS energizes its radio only during periods in which layers which employ sufficient FEC to be received, demodulated and decoded are present for reception.

4. A method for transmission of multimedia data characterized by at least a base layer and at least one enhancement layer, comprising:
   receiving, from at least one base station (BTS), information representing at least one actual operational parameter associated with the multimedia data; and
   dynamically establishing, at a mobile station (MS), at least one of: an error correction rate, and a power level, of at least one layer of the multimedia data based at least in part on the information representing at least one actual operational parameter; and
   selecting which of the base and enhancement layers to be transmitted to the BTS.

5. The method of claim 4, wherein the actual operational parameter is an error rate.

6. The method of claim 4, wherein the actual operational parameter represents at least one of: a channel condition, and a mobile station location.

7. The method of claim 4, wherein the actual operational parameter represents at least one of: mobile station limitations, user priority, content priority, billing plans, and forward error correction (FEC) used for a particular layer.

8. The method of claim 4, wherein the act of dynamically establishing includes establishing a base forward error correction rate for the base layer and an enhancement forward error correction rate for the enhancement layer, the base and enhancement error rates not being constrained to be equal.

9. A mobile station (MS) for wirelessly transmitting digital multimedia having at least N layers to at least one base station (BTS), comprising:
   means for transmitting only N-1 layers or fewer, based on at least one of: FEC rates, power levels, channel conditions, mobile location, mobile station limitations, user priority, content priority, and billing plans, sufficient to allow the layers to be successfully received, demodulated, and decoded by the BTS.

10. The mobile station of claim 9, wherein the means for transmitting operate dynamically.

11. The mobile station of claim 9, further comprising means for receiving, from at least one BTS, information representing at least one actual operational parameter associated with the multimedia data.

12. A mobile station (MS) for wirelessly receMng digital multimedia having at least N layers from at least one base station (BTS), comprising:

means on the MS for instructing the BTS to transmit only N-1 layers or fewer, based on at least one of: FEC rates, power levels, channel conditions, mobile location, mobile station limitations, user priority, content priority, and billing plans, sufficient to allow the layers to be successfully received, demodulated, and decoded by the MS.

13. The mobile station of claim 12, wherein the means for instructing operate dynamically.

14. The mobile station of claim 12. further comprising means for receiving, from at least one BTS, information representing at least one actual operational parameter associated with the multimedia data.

* * * * *